July 3, 1934.  F. X. FINKL  1,965,177
LAWN CULTIVATING TOOL
Filed March 7, 1932

Inventor,
Frank X. Finkl,

Patented July 3, 1934

1,965,177

UNITED STATES PATENT OFFICE 1,965,177

LAWN CULTIVATING TOOL

Frank X. Finkl, Chicago, Ill.

Application March 7, 1932, Serial No. 597,126

1 Claim. (Cl. 97—58)

This invention relates to improvements in hand cultivators for grass lawns, and has for its principal object to provide an improved form of device for preparing and cultivating the surface of the earth for grass seed.

More particularly my improved form of device is adapted for cultivating bare spots of relatively small area on a lawn which requires special treatment for producing conditions conducive to the growing of grass.

It is well known that it is difficult to maintain a grass lawn with a uniform growth of grass, and the grass often grows sparsely or dies out entirely over small areas, due sometimes to excessive wear as where the grass is worn or the earth is tramped down by foot pressure, or where the grass is sparse or bare in certain spots because the soil requires fertilization, or where removal of weeds leaves a relatively sparse standing of grass. In many such instances it has heretofore usually been the practice to recultivate the soil either by raking over the affected areas or even spading them up, preparatory to fertilizing or re-seeding them. These operations, however, are likely to kill the roots of remaining grass, and also have a tendency to destroy the normal level of the ground.

In carrying out my invention, I provide an improved form of tool which is simple in construction and is readily manipulated so as to open up the soil for fertilization and free access of the air to considerable depth, and also placing the soil in condition for re-seeding, but all with a minimum amount of labor and without affecting the level surface of the earth in the treated areas.

My invention may best be understood by reference to the accompanying drawing, in which Figure 1 is a view showing the device in use in the hand of an operator.

Figure 1:
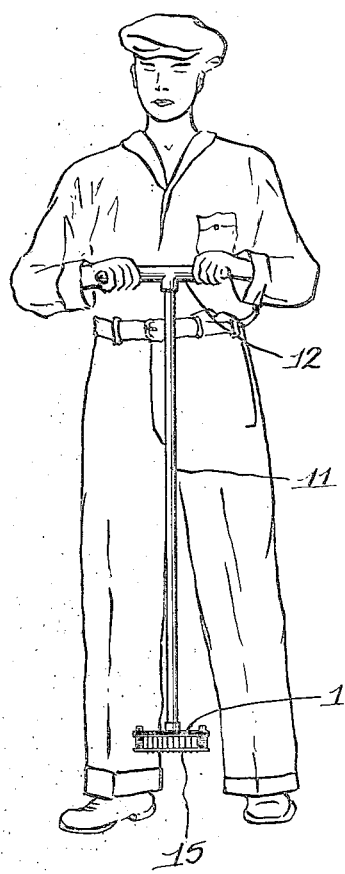
Figure 4:
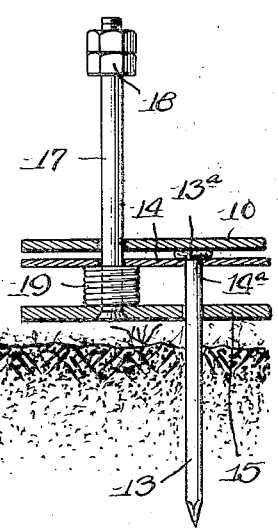
Figure 4 is an enlarged detail section taken on line 4—4 of Figure 3.

Referring now to details of the embodiment of my invention illustrated in the drawing, the same consists of a base plate 10 connected to an upright handle 11 which is preferably provided with a cross bar 12 forming a T-shaped grip. As will be seen in Figure 1, the handle 11 is preferably of such length that the grip 12 will be approximately waist-high of the average operator when the base plate 10 is adjacent the ground, as clearly shown in Figure 1. The device is, therefore, designed to be employed somewhat in the manner of a tamping device, with opposite ends of the grip bar 12 being grasped in the hands of the operator, as shown in this figure.

The base plate 10 is of substantial area, in the form shown being generally circular in shape and at its bottom is provided with a series of downwardly extending vertical spikes 13, 13 which are arranged in spaced position relative to each other so as to cover substantially the entire area of the base plate 10. The spikes 13 are rigidly connected to the base plate 10 by any suitable means. In the form shown, said spikes consist of ordinary nails having their heads 13ª engaged against the under surface of the plate 10 and rigidly secured thereto by a retaining plate 14 provided with holes 14ª through which the nails project. The retaining plate is clamped to the base plate 10 by any suitable means so as to hold the nails in place.

Figure 3:
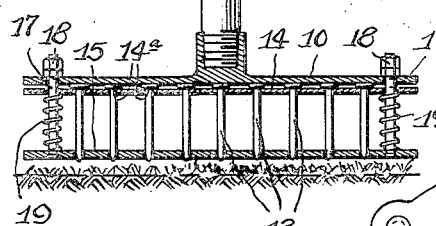
Figure 3 is a transverse sectional view of the device, but with the upper end of the handle omitted.
Figure 2:
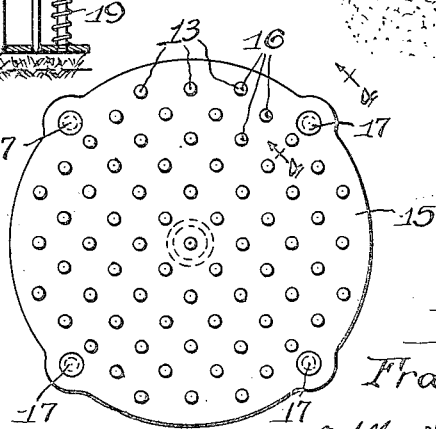
Figure 2 is an enlarged bottom view of the device shown in Figure 1.

A vertically yieldable plate 15 is provided with a series of apertures 16, 16 registering with the several spikes 13, 13 and through which the latter are adapted to project. Means are provided for maintaining the yieldable plate 15 in a position substantially parallel with the base plate 10 and in a plane adjacent the extreme lower ends of the spikes 13, as clearly shown in Figure 3. In the form shown, said means consist of a plurality of upright guide rods 17, 17 which are rigidly connected as by riveting at spaced intervals adjacent the margin of the yieldable plate 15 and extending upwardly through the clamping plate 14 and base plate 10 and having a suitable stop device such as nuts 18 connected thereto above the base plate 10. A coil spring 19 is provided around each of the guide rods 17 and interposed between the clamping plate 14 and the yieldable plate 15, the arrangement being such that the springs 19 are under compression and normally maintain the yieldable plate 15 in extended position, with the stops 18, 18 adjusted so that the lower pointed ends of the spikes 13 are substantially at the same level or slightly below the bottom face of said yielding plate.

The use and operation of the device above described will now be more fully understood. The yielding plate 15 is normally held in extended position under compression, so that the lower ends of the spikes 13 do not project a sufficient distance to be dangerous during ordinary handling of the tool.

When it is desired to cultivate a certain patch of ground, the grip 12 is grasped by both hands of the operator and the tool is manipulated by raising the same several inches from the ground and then dropping it so as to force the spikes in the ground, the yieldable plate 15, of course, engaging the upper surface of the ground and the spikes 13 being projected therethrough due to the force applied to the tool. The springs 19, 19 are of sufficient strength, however, to raise the tool and withdraw the spikes 13 from the ground after pressure upon the tool has been released. Each operation of the tool as described leaves a series of holes in the ground formed by the spikes, but during the withdrawal of the tool any dirt which might otherwise adhere to the sides of the spikes will be cleared therefrom by the yielding plate 15.

The tool is therefore manipulated somewhat in the manner of a tamper, and by repeated application thereof over the area of ground to be treated, a multiplicity of small holes will be formed in the soil, but without affecting the level surface of the earth or digging up the roots of grass which may be already sparsely planted within and around the patch being treated. With the holes thus formed, fertilizer or seed may be applied to the bare patch and much of the fertilizer or seed will fall into the holes, whereupon the holes may then be covered over by lightly brushing over the top surface of the ground by any suitable means. In practice, I find that this can very conveniently be done by the foot of the operator.

It will now be seen that the principal advantage of my invention is the provision of a simple tool whereby bare or sparse patches of lawn can be cultivated for fertilization or seeding in a quick and efficient manner without affecting the normal level of the earth or disturbing the roots of healthy but sparsely planted grass roots which may already be growing. Bare spots may also be loosened to considerable depth so as to be put in condition either for fertilizing or seeding with a minimum amount of effort by the operator.

Although I have illustrated and described one particular embodiment of my invention, it will be understood that I do not wish to be limited to the exact construction shown and described, but that various changes and modifications may be made without departing from the spirit and scope of my invention.

I claim:

A cultivating tool including two superimposed plates, an elongated handle fixed to the upper plate, a plurality of downwardly extending wire nails projecting from the lower plate, a vertically yielding plate formed with a series of apertures registering with said wire nails, and spring means between the lower plate and the yielding plate for holding the same in parallel spaced relation, said spring means normally retaining the superimposed plates together to prevent independent movement of said wire nails.

FRANK X. FINKL.